US010501568B1

United States Patent
Li et al.

(10) Patent No.: US 10,501,568 B1
(45) Date of Patent: Dec. 10, 2019

(54) SULFONATE LYCINE TYPE HYDROPHOBIC ASSOCIATED POLYMER AND PREPARATION METHOD THEREOF

(71) Applicant: SOUTHWEST PETROLEUM UNIVERSITY, Chengdu (CN)

(72) Inventors: Yongming Li, Chengdu (CN); Qiang Ren, Chengdu (CN); Jinzhou Zhao, Chengdu (CN); Youshi Jiang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 24 days.

(21) Appl. No.: 16/068,898

(22) PCT Filed: May 22, 2017

(86) PCT No.: PCT/CN2017/085328
§ 371 (c)(1),
(2) Date: Jul. 10, 2018

(87) PCT Pub. No.: WO2018/209716
PCT Pub. Date: Nov. 22, 2018

(30) Foreign Application Priority Data

May 16, 2017 (CN) .......................... 2017 1 0342023

(51) Int. Cl.
C08F 220/60 (2006.01)
C08F 2/48 (2006.01)
C08F 220/06 (2006.01)
C08F 220/58 (2006.01)
C08K 5/29 (2006.01)

(52) U.S. Cl.
CPC .............. *C08F 220/60* (2013.01); *C08F 2/48* (2013.01); *C08F 220/06* (2013.01); *C08F 220/58* (2013.01); *C08F 2220/585* (2013.01); *C08F 2220/603* (2013.01); *C08F 2220/606* (2013.01); *C08K 5/29* (2013.01)

(58) Field of Classification Search
CPC ........ C08F 220/60; C08F 2/48; C08F 220/06; C08F 220/58; C08F 2220/585; C08F 2220/603; C08F 2220/606; C08K 5/29
USPC ........................................................ 524/812
See application file for complete search history.

(56) References Cited

U.S. PATENT DOCUMENTS

2010/0093874 A1* 4/2010 Monin .................. C08F 220/38
514/772.4
2012/0115079 A1* 5/2012 Ikeda ..................... B82Y 30/00
430/108.7

FOREIGN PATENT DOCUMENTS

| CN | 104231169 | * 12/2014 |
| CN | 104231169 A | 12/2014 |
| CN | 105085331 A | 11/2015 |
| CN | 105669499 A | 6/2016 |
| WO | 2015055730 A1 | 4/2015 |

OTHER PUBLICATIONS

Ji et al., Colloids and Surfaces A: Physicochem. Eng. Aspects, 509, 440-448, 2016. (Year: 2016).*
Wu Xiaoyan et al. A Surface-active Two-tailed Hydrophobic Associated Acrylamide Copolymer. Guangdong Chemical Industry, 2014, 41(22): 42-44.
Pu Wanfen et al. Synthesis and Property Evaluation of Two-tailed Acrylamide Type Hydrophobic Associated Polymer. Modern Chemicals, 2016(4):117-120.

* cited by examiner

*Primary Examiner* — Hui H Chin
(74) *Attorney, Agent, or Firm* — Gokalp Bayramoglu

(57) ABSTRACT

The present invention discloses a sulfonate lycine type hydrophobic associated polymer and a preparation method thereof. A preparation process of the sulfonate lycine type hydrophobic associated polymer comprises the following steps: firstly, mixing acrylamide and acrylic acid in an aqueous solution; adjusting pH of the system to be around 6 to 8; adding 3-(dimethylamino propyl methacrylamide) propanesulfonate, N-aryl-N-alkyl (methyl) acrylamide and lauryl sodium sulfate and stirring till the solution is clear; and after nitrogen is introduced for deoxidization, adding a photoinitiator azobis (isobutylamidine hydrochloride) for performing polymerization under photoinitiation conditions. The sulfonate lycine type hydrophobic associated polymer integrates the advantages of a two-tailed hydrophobic associated polymer and the advantages of a lycine type polymer, such that the viscosifying property, the temperature resistance, the salt resistance and the hydrolysis resistance of the sulfonate lycine type hydrophobic associated polymer are remarkably improved.

3 Claims, 2 Drawing Sheets

SULFONATE LYCINE TYPE HYDROPHOBIC ASSOCIATED POLYMER AND PREPARATION METHOD THEREOF

CROSS REFERENCE TO RELATED APPLICATIONS

This application is the national phase entry of International Application No. PCT/CN2017/085328, filed on May 22, 2017, which is based upon and claims priority to Chinese Patent Application No. 201710342023.4, filed on May 16, 2017, the entire contents of which are incorporated herein by reference.

TECHNICAL FIELD

The present invention relates to a sulfonate lycine type hydrophobic associated polymer for an oilfield to increase a recovery rate and perform acid fracturing, and a preparation method thereof.

BACKGROUND

For a hydrophobic associated polymer, a small amount of hydrophobic groups are introduced to copolymer molecular chains, such that the solution of the hydrophobic associated polymer has efficient viscosifying property, excellent salt resistance, and better temperature resistance and shear resistance, and is widely applied to increase a recovery rate and perform acid fracturing for an oilfield. However, for a high temperature and high salinity reservoir, the temperature resistance and salt resistance of the hydrophobic associated polymer still need to be improved.

For a two-tailed hydrophobic monomer containing a long-chain alkyl group and a benzene ring (Wu Xiaoyan et al. A Surface-active Two-tailed Hydrophobic Associated Acrylamide Copolymer. Guangdong Chemical Industry, 2014, 41(22): 42-44; Pu Wanfen et al. Synthesis and Property Evaluation of Two-tailed Acrylamide Type Hydrophobic Associated Polymer. Modern Chemicals, 2016(4):117-120), by the introduction of the benzene ring, the temperature resistance and hydrolysis resistance of the polymer are effectively improved; by the introduction of the long-chain alkyl group, the hydrophobic association effect of the polymer is improved favorably; a main structure of acrylamides is adopted to make the hydrophobic monomer easy to polymerize with main monomer acrylamide; the two-tailed structure effectively improves the hydrolysis resistance and hydrophobic association effect of the hydrophobic monomer. Therefore, the synthesized hydrophobic associated polymer achieves the purposes of resistance to heat, salt and hydrolysis.

Sulfonate betaine monomer is a kind of polymerizable functional monomer which contains equal number of quaternary ammonium cations and sulfonate anions and is not easily affected by pH and inorganic electrolytes. The molecules of the sulfonate betaine monomer are electrically neutral and have good chemical thermal stability and strong hydration capabilities, and copolymers of the sulfonate betaine monomer exhibit an obvious anti-polyelectrolyte behavior. In 2002, LOWE A B et al. found that polybetaine had short-range attraction and remote repulsion, and the apparent viscosity of an aqueous solution of the polybetaine increased with the increase of the concentration of external electrolyte (such as NaCl), showing an obvious anti-polyelectrolyte behavior, such that the polymer has better salt resistance. In 2012, Ding Wei, et al. used 3-(dimethylamino propyl acrylamide) propanesulfonate to copolymerize with acrylamide to obtain a copolymer P(ΔM-DMAPAAS) whose viscosity in saline water is higher than that in distilled water and whose viscosity in a salt solution containing divalent ions ($Mg^{2+}$ or $Ca^{2+}$) is larger than that in a monovalent ion salt solution ($Na^+$ or $K^+$) and increases with the increase of the salinity of the solution. In 2015, Chen Hong, et al. used acrylamide as a main monomer, allyl long-chain alkyl quaternary ammonium salt as a hydrophobic monomer, and sulfonate betaine as a functional monomer to perform terpolymerization to produce the sulfonate betaine type hydrophobic associated polymer which has temperature resistance and salt resistance properties and still has higher viscosity at 85° C.

SUMMARY

An objective of the present invention is to provide a sulfonate lycine type hydrophobic associated polymer which integrates the advantages of a two-tailed hydrophobic associated polymer and the advantages of a lycine type polymer, such that the properties of the polymer, such as temperature resistance, salt resistance and hydrolysis resistance are improved. The sulfonate lycine type hydrophobic associated polymer can be used as an oil-displacing agent or an acid fracturing thickener for increasing a crude oil recovery rate in oilfield development and overcome the defects and deficiencies of the prior art.

Another objective of the present invention is to provide a preparation method of the sulfonate lycine type hydrophobic associated polymer. By the introduction of a sulfonate betaine monomer into polymer molecular chains, the properties of the hydrophobic associated polymers, such as viscosifying property, temperature resistance, salt resistance, and hydrolysis resistance, can be significantly improved. The method is reliable in principle and simple in operation and has a broad market prospect.

To fulfill said technical objectives, the present invention provides the following technical solution.

A sulfonate lycine type hydrophobic associated polymer has the following structural formula:

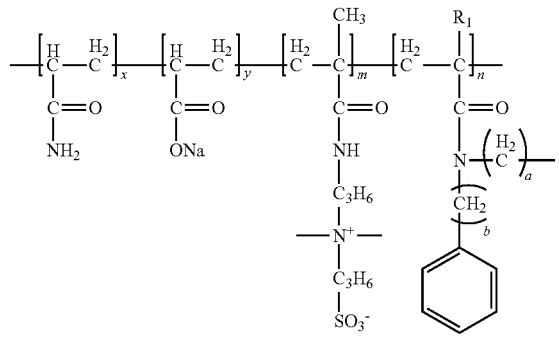

in the formula, x, y, m, and n are percentages of structural units, where x is 75 to 85%, m is 0.01 to 1.0%, n is 0.01 to 0.5%, and y is 1-x-m-n; a, b are numbers of structural units, where a is 11, 13 or 15, and b is 1 or 2; $R_1$ is $CH_3$ or H.

The polymer has a viscosity average molecular weight of 100 to 10,000,000.

A preparation process of the sulfonate lycine type hydrophobic associated polymer comprises the following steps: firstly, mixing acrylamide and acrylic acid in an aqueous solution; adjusting pH of the system to be around 6 to 8; adding 3-(dimethyl amino propyl methacrylamide) propanesulfonate, N-aryl-N-alkyl (methyl) acrylamide and lauryl sodium sulfate and stirring till the solution is clear; and after nitrogen is introduced for deoxidization, adding a photoinitiator azobis (isobutylamidine hydrochloride) (v5) for performing polymerization under photoinitiation conditions to prepare the sulfonate lycine type hydrophobic associated polymer.

The preparation method of the sulfonate lycine type hydrophobic associated polymer sequentially comprises the following steps:

(1) adding acrylamide and acrylic acid to distilled water and stirring uniformly, adjusting pH to 6 to 8 with sodium hydroxide, adding 3-(dimethylamino propyl methacrylamide) propanesulfonate, hydrophobic monomer N-aryl-N-alkyl (methyl) acrylamide and a surfactant lauryl sodium sulfate and stirring till the solution is clear, wherein the total mass percentage of reaction monomers is 25 to 28.5 wt %, in which acrylamide accounts for 20-21.5 wt %, acrylic acid accounts for 3.5-5 wt %, 3-(dimethylamino propyl methacrylamide) propanesulfonate accounts for 0.2-1.0 wt %, N-aryl-N-alkyl (methyl) acrylamide accounts for 0.2-0.6 wt % and lauryl sodium sulfate accounts for 0.4-0.8 wt %;

(2) introducing nitrogen for 15 min to remove dissolved oxygen in water;

(3) adding a photoinitiator and reacting for 3 to 5 h at 10 to 30° C. under a photoinitiation device to obtain viscous white colloid, i.e., the sulfonate lycine type hydrophobic associated polymer.

The photoinitiator is azobis (isobutylamidine hydrochloride) (v50).

Compared with the prior art, the present invention has the following beneficial effects: the two-tailed hydrophobic monomer with an acrylamide structure is similar to the acrylamide structure and easily copolymerized with main monomer acrylamide; by the introduction of a benzene ring, the hydrolysis of amide groups can be effectively inhibited, and meanwhile the rigidity of molecular chains can be increased and the temperature resistance of the polymer can be improved; by the introduction of a long-chain alkyl group, the favorable hydrophobic association effect of the polymer is achieved; the two-tailed structure of the hydrophobic monomer effectively inhibits of the hydrolysis of amide groups and improve the hydrophobic association effect.

By the introduction of a sulfonate betaine monomer into polymer molecular chains, the properties of the hydrophobic associated polymer, such as viscosifying property, temperature resistance, salt resistance, and hydrolysis resistance, can be significantly improved.

The sulfonate lycine type hydrophobic associated polymer of the present invention can be used as an oil-displacing agent or an acid fracturing thickener for increasing a crude oil recovery rate in oilfield development, and has a broad market prospect.

DETAILED DESCRIPTION OF THE EMBODIMENTS

Figure 1:
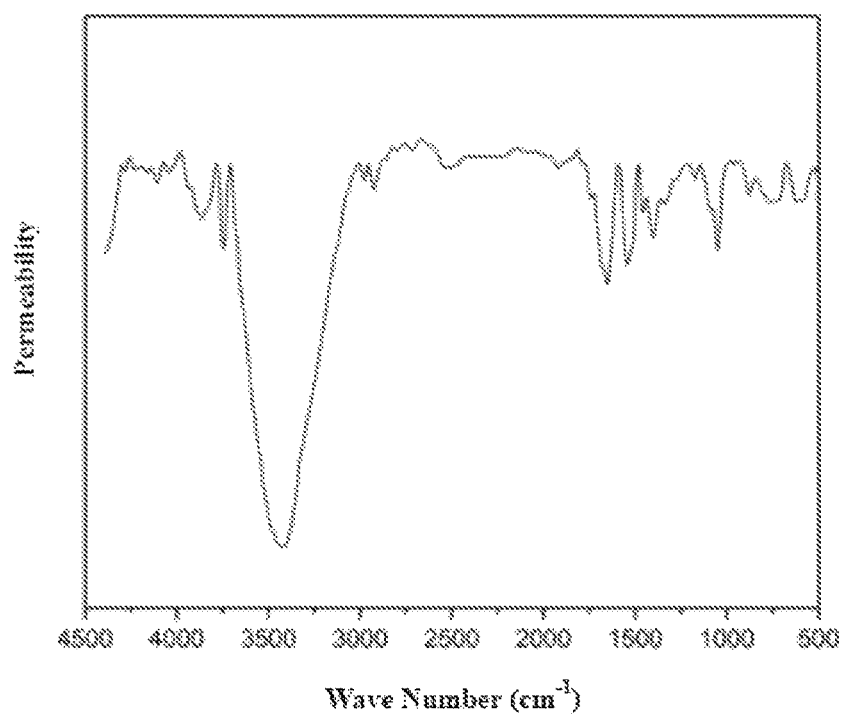
FIG. 1 is an infrared spectrum of a sulfonate lycine type hydrophobic associated polymer.

The present invention is described below in detail according to the drawings and the examples.

I. Preparation of Sulfonate Lycine Type Hydrophobic Associated Polymer

Example 1 weighing acrylamide (10 g), acrylic acid (2.5 g), adding distilled water and stirring uniformly, and adjusting pH to 7; then, adding 3-(dimethylamino propyl methacrylamide) propanesulfonate (0.1 g), N-aryl-N-lauryl methacrylamide and lauryl sodium sulfate (0.3 g), then adding a certain amount of distilled water such that the total mass of the solution reaches 50 g, and stirring till the solution is clear; introducing nitrogen for 15 min to remove dissolved oxygen in water; and adding an initiator v50 (0.1-0.2 wt % of total monomer mass), placing under a photoinitiation device, and reacting for 3 h.

Example 2 weighing acrylamide (10 g), acrylic acid (2.5 g), adding distilled water and stirring uniformly, and adjusting pH to 7; then, adding 3-(dimethylamino propyl methacrylamide) propanesulfonate (0.1 g), N-aryl-N-lauryl methacrylamide (0.1 g) and lauryl sodium sulfate (0.3 g), then adding a certain amount of distilled water such that the total mass of the solution reaches 50 g, and stirring till the solution is clear; introducing nitrogen for 15 min to remove dissolved oxygen in water; and adding an initiator v50 (0.1-0.2 wt % of total monomer mass), placing under a photoinitiation device, and reacting for 3 h.

II. Structural Characterization of Sulfonate Lycine Type Hydrophobic Associated Polymer FIG. 1 is an infrared spectrum of the polymer synthesized in the example 1.

As can be seen from FIG. 1, a characteristic absorption peak of stretching vibration of N—H of primary amide appears at 3408 $cm^{-1}$; characteristic absorption peaks of antisymmetric stretching vibration and symmetrical stretching vibration of methylene appear at 2981 $cm^{-1}$ and 2897 $cm^{-1}$; a characteristic absorption peak of carbonyl appears at 1640 $cm^{-1}$; a stretching vibration peak of a benzene ring skeleton appears at 1531 $cm^{-1}$; an in-plane bending vibration absorption peak of methylene appears at 1398 $cm^{-1}$; a stretching vibration absorption peak of C—N in quaternary ammonium salt appears at 1320 $cm^{-1}$; symmetrical and asymmetric vibration absorption peaks of —$SO_3^-$ appear at 1088 $cm^{-1}$ and 1049 $cm^{-1}$; an out-of-plane rocking characteristic peak of primary amide-$NH_2$ appears at 615 $cm^{-1}$.

Figure 2:
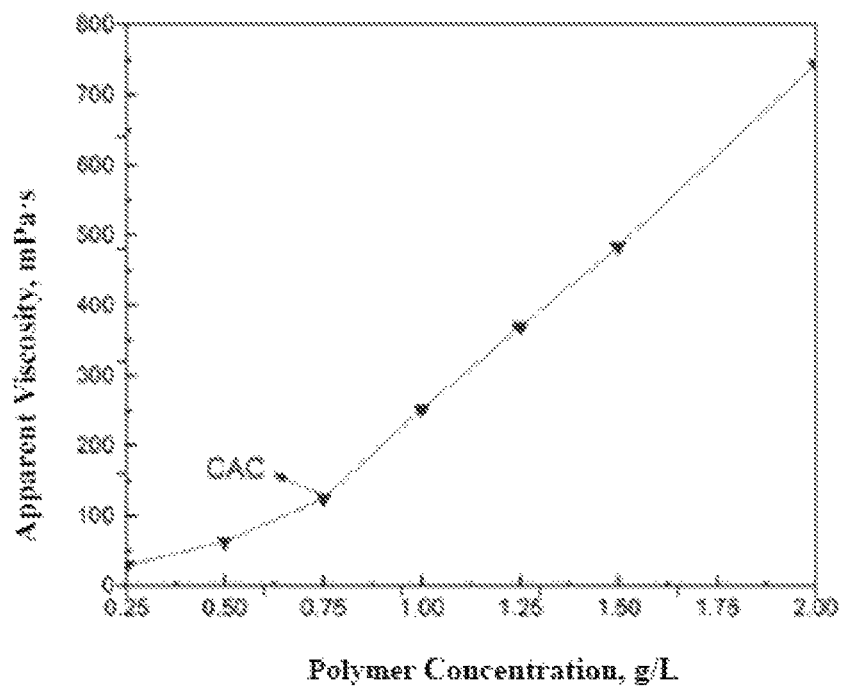
FIG. 2 is a viscosity-concentration relationship curve of the sulfonate lycine type hydrophobic associated polymer.

III. Viscosifying Effect Analysis of Sulfonate Lycine Type Hydrophobic Associated Polymer The polymer synthesized in the example 1 is prepared into polymer solutions of different concentrations. A viscosity-concentration relationship curve of the polymer is measured at room temperature and at a shear rate of 7.34 $s^{-1}$ (as shown in FIG. 2). As can be seen from FIG. 2, the sulfonate lycine type hydrophobic associated polymer has lower critical association concentration and a good viscosifying effect which reaches 743.7 mPa·s at 2000 mg/L.

IV. Sensitivity to Salt of Sulfonate Lycine Type Hydrophobic Associated Polymer

Figure 3:
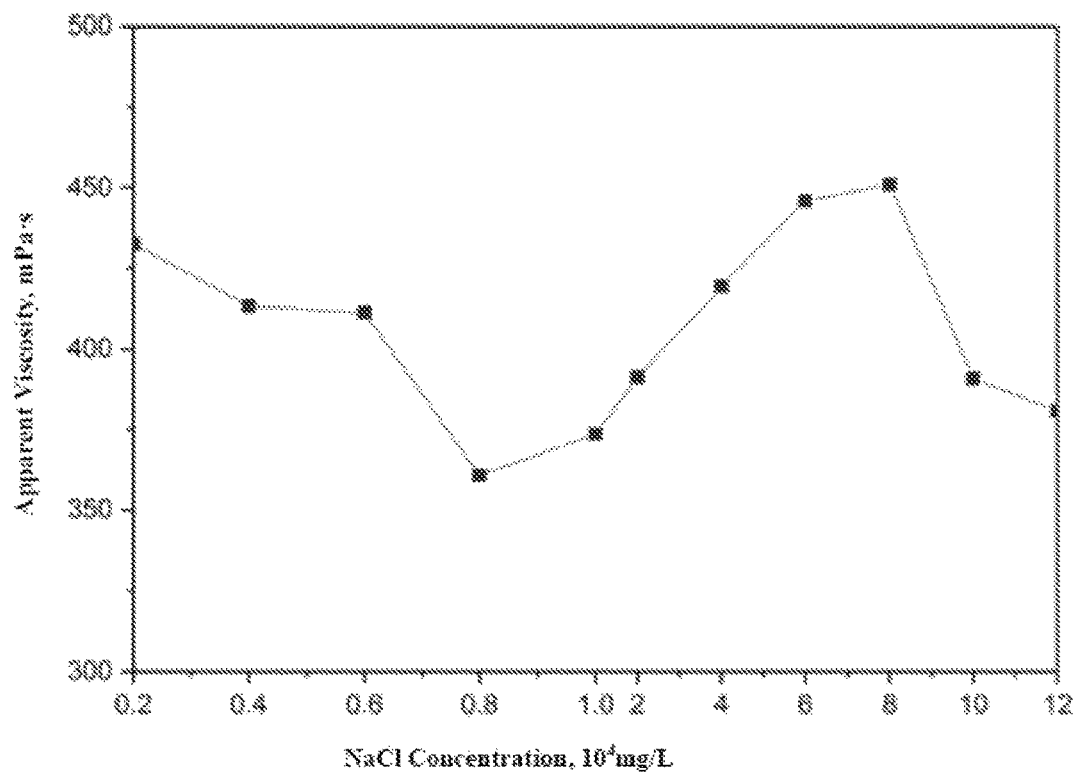
FIG. 3 is a viscosity-salinity relationship curve of the sulfonate lycine type hydrophobic associated polymer.

A study is made for the sensitivity to salt of the polymer synthesized in the example 1. The prepared hydrophobic associated polymer is prepared into a 2000 mg/L polymer solution at different salinities. A change relationship of the apparent viscosity of the polymer solution along with the salinity is measured at room temperature and at a shear rate of 7.34 $s^{-1}$ (as shown in FIG. 3). As can be seen from FIG. 3, with the increase of NaCl concentration, the apparent viscosity of the polymer presents a trend of decrease-increase-decrease, and the viscosity of the polymer solution can still be maintained at 50% or more under high salinity 120,000 of NaCl, showing a favorable salt resistance effect.

V. Anti-Aging Property of Sulfonate Lycine Type Hydrophobic Associated Polymer

The anti-aging property of the polymer synthesized in the example 1 is evaluated. The prepared hydrophobic associated polymer is prepared into a 2000 mg/L polymer solution, deoxidant is added to the solution and then the mixture is placed in a vial, and sealed. The mixture is aged in a 90° C. oven, and the viscosity of the polymer solution is measured at regular time.

Figure 4:
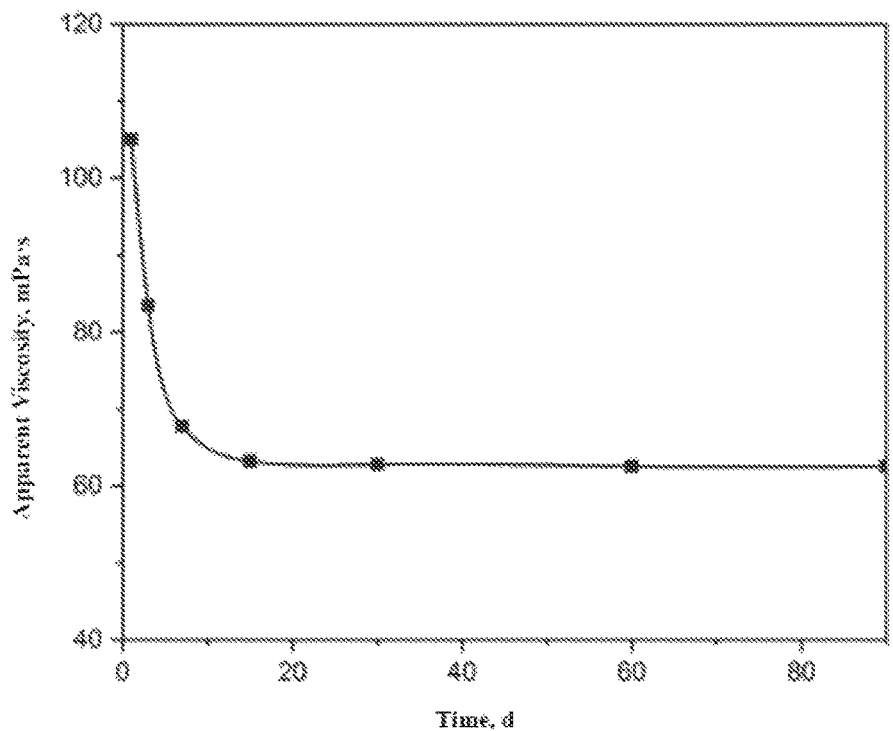
FIG. 4 is a viscosity-aging days relationship curve of the sulfonate lycine type hydrophobic associated polymer.

As can be seen from FIG. 4, the viscosity is stable after the polymer solution is aged for about 30 d. At a temperature of 90° C. and a salinity (NaCl) of $10 \times 10^4$ mg/L, the viscosity of the polymer solution can still be maintained at 60 mPa·s or more, showing good resistance to temperature, salt and aging.

The invention claimed is:

1. A sulfonate lycine hydrophobic associated polymer, comprising the following structural formula:

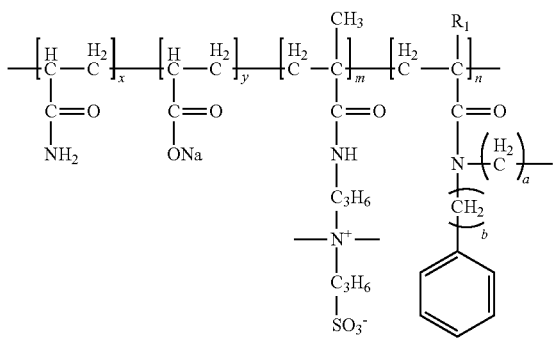

wherein in the formula, x, y, m, and n are percentages of first structural units, wherein x is 75% to 85%, m is 0.01% to 1.0%, n is 0.01% to 0.5%, and y is 1-x-m-n; a, b are numbers of second structural units, wherein a is 11, 13 or 15, and b is 1 or 2; R1 is $CH_3$ or H; and a viscosity average molecular weight of the sulfonate lycine hydrophobic associated polymer is from 100 to 10,000,000.

2. A preparation method of the sulfonate lycine hydrophobic associated polymer according to claim 1, sequentially comprising the following steps:
(1) adding acrylamide and acrylic acid to distilled water and stirring uniformly to obtain a first solution, adjusting pH of the first solution to 6-8 with sodium hydroxide to obtain a second solution, adding 3-(dimethylamino propyl methacrylamide) propanesulfonate, hydrophobic monomer N-aryl-N-alkyl (methyl) acrylamide and a surfactant lauryl sodium sulfate to the second solution to obtain a third solution and stirring till the third solution is clear, wherein the acrylamide accounts for 20-21.5 wt %, the acrylic acid accounts for 3.5-5 wt %, the 3-(dimethylamino propyl methacrylamide) propanesulfonate accounts for 0.2-1.0 wt %, the N-aryl-N-alkyl (methyl) acrylamide accounts for 0.2-0.6 wt % and the lauryl sodium sulfate accounts for 0.4-0.8 wt %, wt % refers to the mass fraction of the above substances in a reaction system;
(2) introducing nitrogen to the third solution for 15 minutes to remove dissolved oxygen in the third solution to obtain a fourth solution; and
(3) adding a photoinitiator to the fourth solution to obtain a fifth solution, and reacting the fifth solution for 3-5 hours at 10-30° C. under a photoinitiation device to obtain viscous white colloid, the viscous white colloid is the sulfonate lycine hydrophobic associated polymer.

3. The preparation method of the sulfonate lycine hydrophobic associated polymer according to claim 2, wherein the photoinitiator is azobis (isobutylamidine hydrochloride).

* * * * *